US012458562B2

(12) United States Patent
Wang

(10) Patent No.: US 12,458,562 B2
(45) Date of Patent: Nov. 4, 2025

(54) SEX TOY

(71) Applicants: Dongguan Mimao Electronic Technology Co., Ltd., Guangdong (CN); Shenzhen Zhonghongtian Technology Co., Ltd., Shenzhen (CN)

(72) Inventor: Qinling Wang, Guangdong (CN)

(73) Assignees: Dongguan Mimao Electronic Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/746,012

(22) Filed: Jun. 17, 2024

(65) Prior Publication Data

US 2025/0161147 A1 May 22, 2025

Related U.S. Application Data

(63) Continuation-in-part of application No. 18/516,984, filed on Nov. 22, 2023, now Pat. No. 12,161,598.

(51) Int. Cl.
*A61H 19/00* (2006.01)
*A61H 7/00* (2006.01)
*A61H 23/02* (2006.01)

(52) U.S. Cl.
CPC ............ *A61H 19/32* (2013.01); *A61H 7/007* (2013.01); *A61H 23/0254* (2013.01);
(Continued)

(58) Field of Classification Search
CPC .......... A61H 7/00; A61H 7/001; A61H 7/002; A61H 7/003; A61H 7/004; A61H 7/005;
(Continued)

(56) References Cited

U.S. PATENT DOCUMENTS 6,190,339 B1 2/2001 Imazaike et al.
11,369,545 B1 * 6/2022 He ........................ A61H 7/001
(Continued)

FOREIGN PATENT DOCUMENTS

CN 104352254 A 2/2015
CN 204890546 U * 12/2015
(Continued)

OTHER PUBLICATIONS

Notice of Refusal Dated Dec. 17, 2024 for Corresponding Japan Application No. 2024-201869.
(Continued)

*Primary Examiner* — Colin W Stuart
(74) *Attorney, Agent, or Firm* — Andrew C. Cheng

(57) ABSTRACT

A sex toy includes a shell with a central portion and at least three swinging portions extending outwardly from an outer periphery of the central portion, and at least three swinging bars being rotatably connected to the shell, respectively. The at least three swinging portions are arranged along a circumferential direction of the central portion and cooperatively define a chamber for accommodating a breast of the human body therein. The at least three swinging bars each includes a swinging end extending into one of the at least three swinging portions, so as to drive the at least three swinging portions to swing towards the central portion or away from the central portion to knead the breast accommodated inside the chamber.

18 Claims, 10 Drawing Sheets

(52) U.S. Cl.
CPC ................ *A61H 2201/1215* (2013.01); *A61H 2201/1472* (2013.01); *A61H 2201/1676* (2013.01); *A61H 2205/082* (2013.01)

(58) Field of Classification Search
CPC ........ A61H 7/007; A61H 7/008; A61H 23/00; A61H 23/02; A61H 23/0254; A61H 19/00; A61H 19/30; A61H 19/32; A61H 19/34; A61H 19/50; A61H 2201/1215; A61H 2201/1472; A61H 2201/1676; A61H 2205/082
See application file for complete search history.

(56) References Cited

U.S. PATENT DOCUMENTS

| | | | | |
|---|---|---|---|---|
| 11,491,078 | B1 * | 11/2022 | He | A61H 7/005 |
| 11,554,073 | B1 | 1/2023 | Guo | |
| 11,633,327 | B1 * | 4/2023 | Wu | A61H 23/0263 601/70 |
| 11,806,306 | B1 * | 11/2023 | Guo | A61H 7/007 |
| 2015/0065792 | A1 | 3/2015 | Levine | |
| 2019/0209359 | A1 | 7/2019 | Trost et al. | |
| 2019/0240109 | A1 | 8/2019 | Barkay | |
| 2020/0368103 | A1 | 11/2020 | Rakshit | |
| 2022/0096320 | A1 | 3/2022 | Lu | |
| 2024/0252383 | A1 * | 8/2024 | Liufu | A61H 7/007 |

FOREIGN PATENT DOCUMENTS

| | | | |
|---|---|---|---|
| CN | 106344382 | A | 1/2017 |
| CN | 107551410 | A | 1/2018 |
| CN | 210872865 | U | 6/2020 |
| CN | 211584149 | U | 9/2020 |
| JP | 2010125335 | A | 6/2010 |
| JP | 2020081721 | A | 6/2020 |
| KR | 101310270 | B1 | 9/2013 |
| WO | 2014096476 | A1 | 6/2014 |
| WO | 2023194974 | A1 | 10/2023 |

OTHER PUBLICATIONS

Notice of Refusal Dated Jan. 28, 2025 for Corresponding Japan Application No. 2024-203424.
Notice of Refusal Dated Feb. 18, 2025 for Corresponding Japan Application No. 2024-202360.
International Search Report Dated Mar. 19, 2025 for Corresponding PCT Application No. PCT/CN2024/134000.
Written Opinion of the International Searching Authority Dated Mar. 19, 2025 for Corresponding PCT Application No. PCT/CN2024/134000.
Office Action Dated Apr. 10, 2025 for Corresponding European Patent Application No. 24214864.1.
The Extended European Search Report Dated Aug. 12, 2025 for Corresponding European Patent Application No. 24214864.1.

* cited by examiner

SEX TOY

CROSS-REFERENCE TO RELATED APPLICATIONS

This application is continuation in part application of application Ser. No. 18/516,984, entitled "Sex Toy", filed on Nov. 22, 2023, the entire contents of which are hereby incorporated by reference.

TECHNICAL FIELD

The present application relates to the technical field of adult products, and in particular to a sex toy.

BACKGROUND

In recent years, various adult sex products have been developed to help the users to release their sex pressure. Generally, the existing sex toy uses vibration motor(s) to provide high-frequency vibration to stimulate the user's sensitive areas, such as the breast, the genitalia and the like, which has poor stimulation effect and thus is difficult to meet users' needs.

SUMMARY

An object of the present application is to provide a sex toy which can provide better stimulation effect, thereby improving the sexual experience.

In order to achieve the above object, an embodiment of the present application provides a sex toy, including:

a shell including a central portion and at least three swinging portions extending outwardly from an outer periphery of the central portion, the at least three swinging portions being arranged along a circumferential direction of the central portion and cooperatively defining a chamber for accommodating a breast of the human body therein; and at least three swinging bars being rotatably connected to the shell, respectively, the at least three swinging bars each comprising a swinging end, the swinging ends extending into the at least three swinging portions, respectively, so as to drive the at least three swinging portions to swing towards the central portion or away from the central portion to knead the breast accommodated inside the chamber.

Compared with the prior art, the sex toy according to embodiments of this application includes at least three swinging portions swinging towards or away from each other to knead the breast of the human body, thereby providing better stimulation effects to the user and accordingly improving the user's sexual experience.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 7, a sex toy 100 according an embodiment of the present application is shown. In this embodiment, the sex toy 100 includes a shell 20 and stimulation modules 30, 40 mounted in the shell 20.

Figure 1:
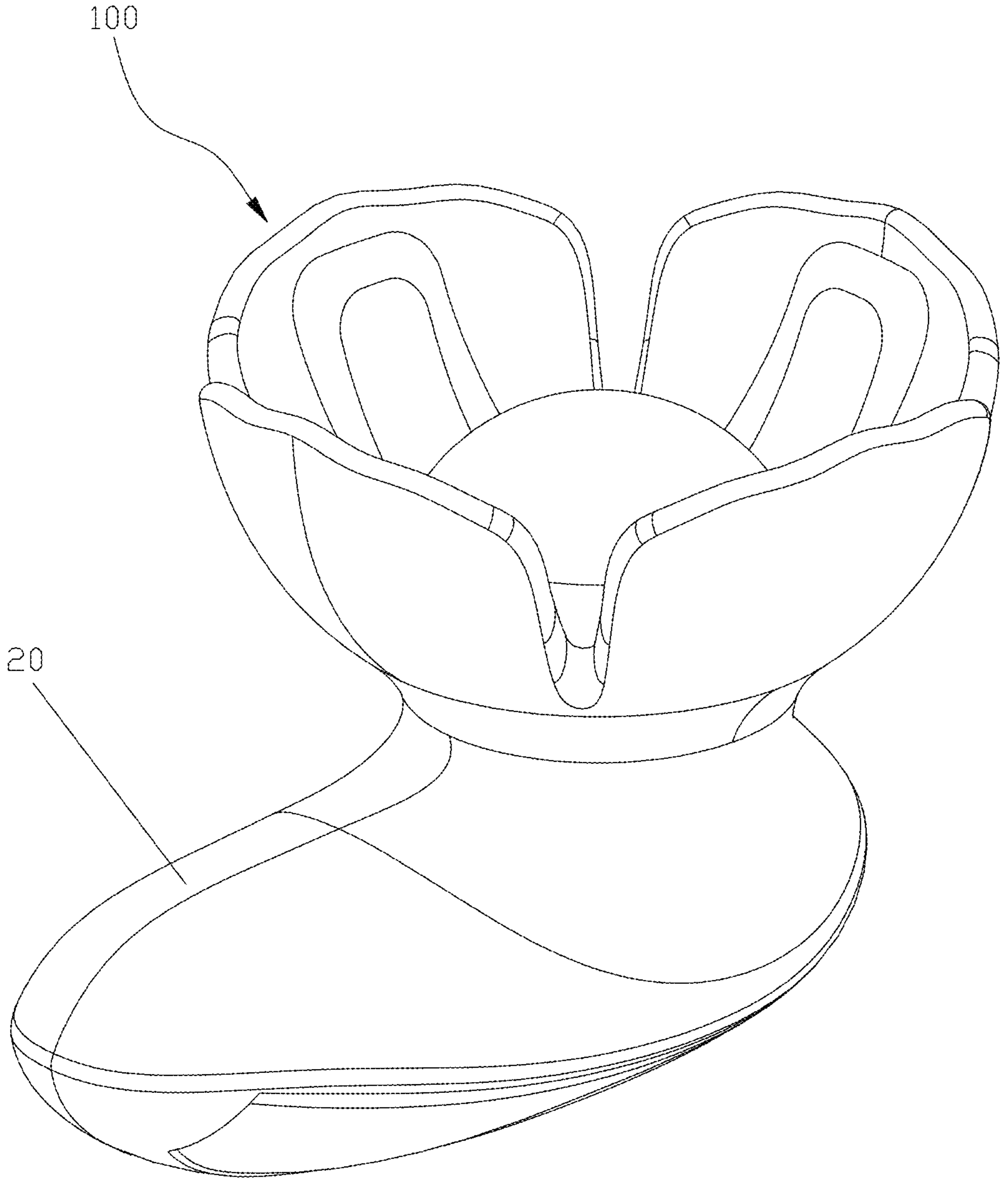
FIG. 1 is an isometric, assembled view of a sex toy according to a first embodiment of the present application.
Figure 2:
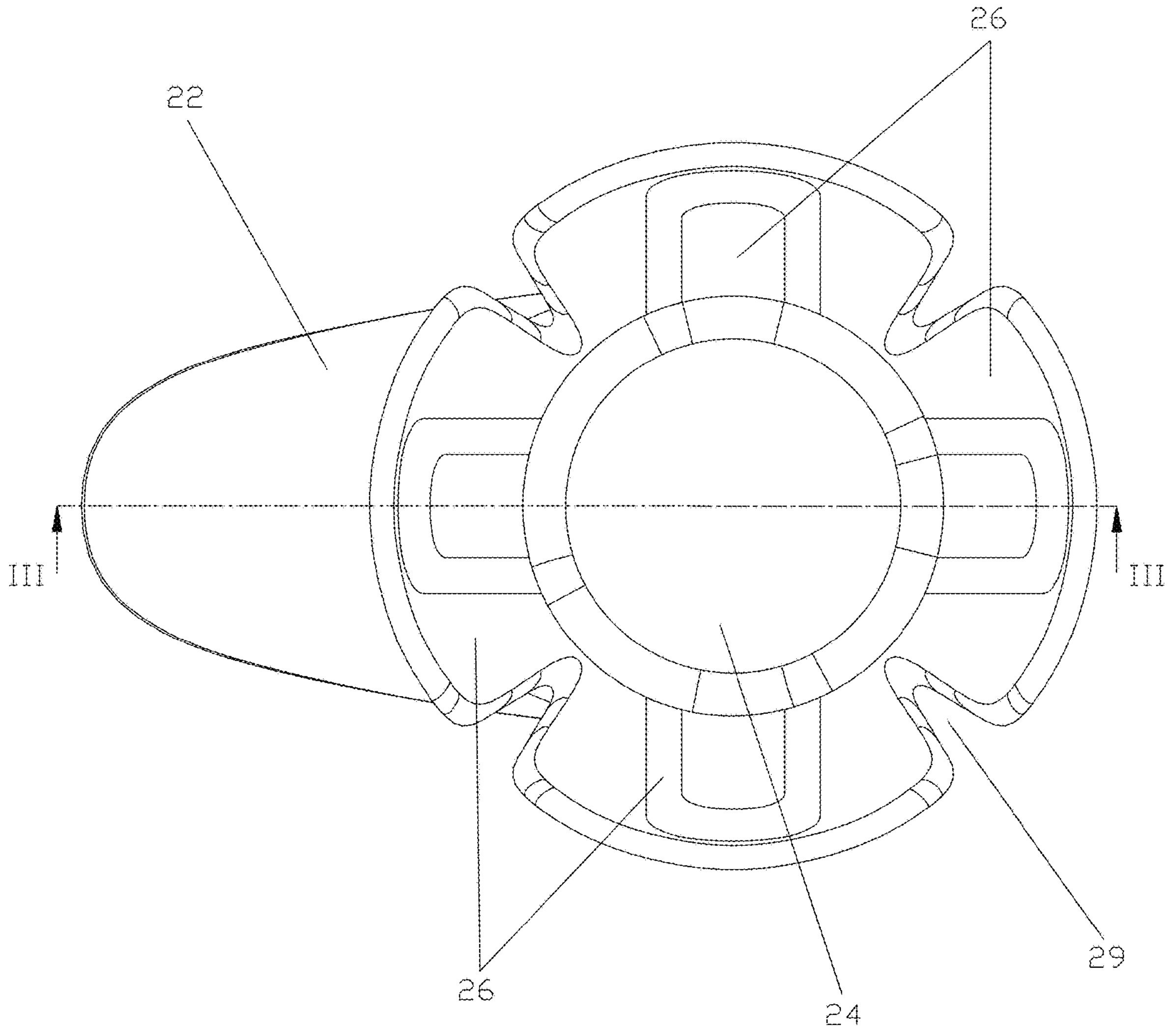
FIG. 2 is a top plan view of the sex toy of FIG. 1.
Figure 3:
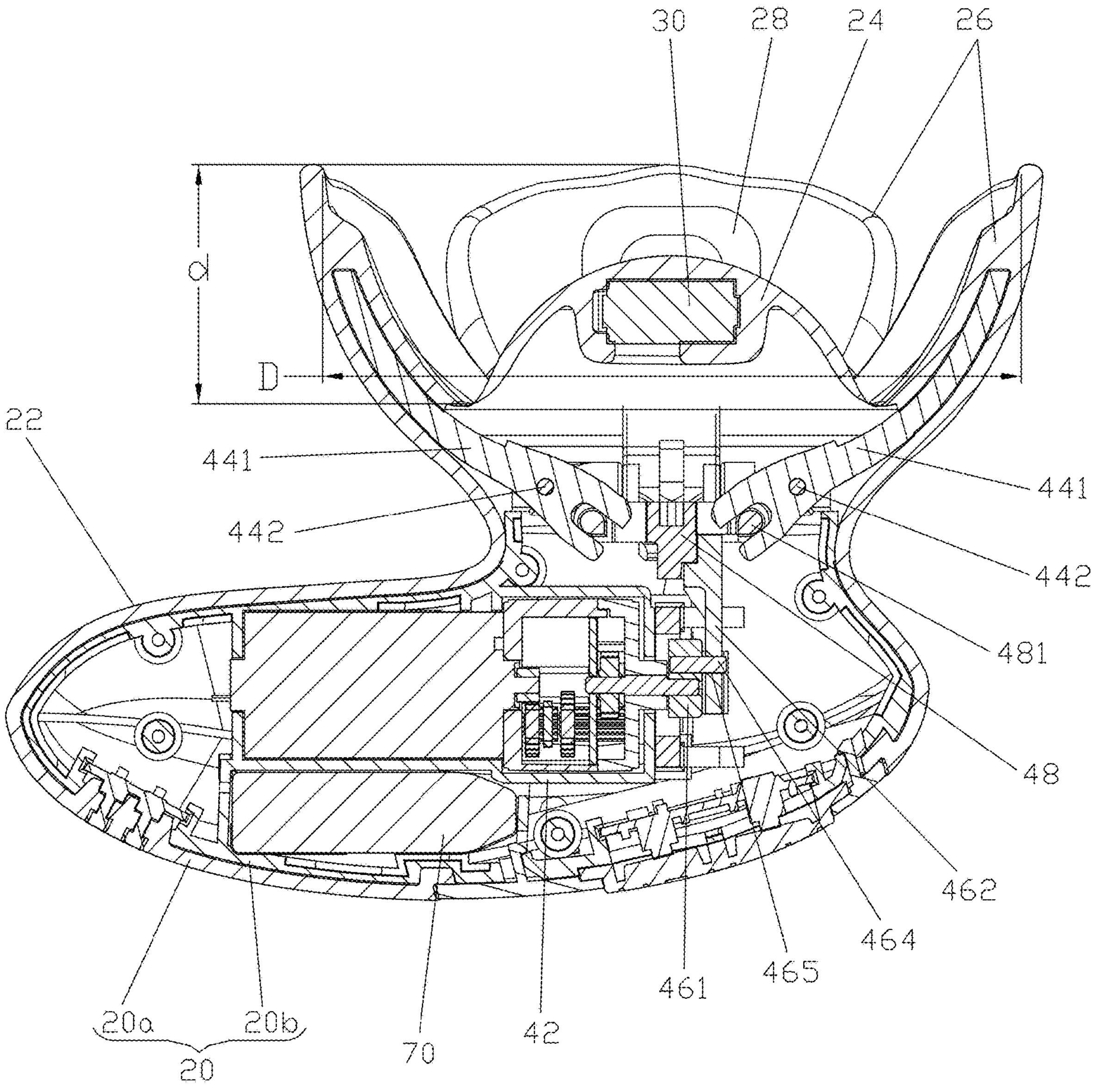
FIG. 3 is a cross sectional view of the sex toy taken along line III-III of FIG. 2.
Figure 4:
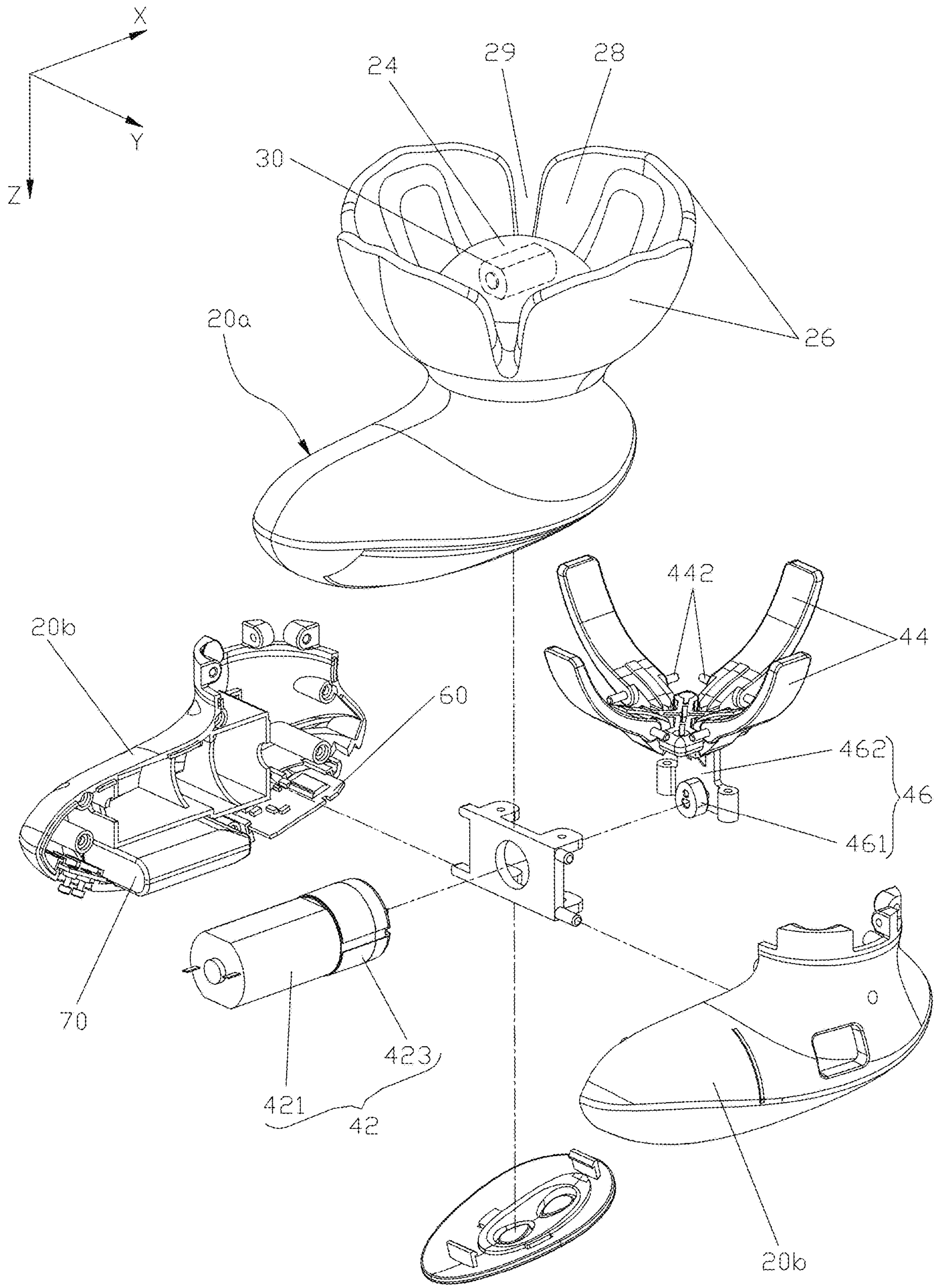
FIG. 4 is an exploded view of the sex toy of FIG. 1.

As shown in FIG. 3 and FIG. 4, the shell 20, preferably, is a double-layer structure, and includes an outer shell **20*a* and an inner shell 20*b* being integrally fixed inside the outer shell 20*a*. The inner shell 20*b* may be made of hard materials, such as plastic, metal and etc., which has a relatively high strength and thus provides support for the stimulation modules 30, 40 mounted inside the shell 20. The outer shell 20*a* may be made of flexible materials, such as silicone, rubber and etc., for directly contacting a part of the human body which needs to be stimulated, so that the present sex toy 100** in whole has high strength and comfortable use experience.

In a specific embodiment, firstly, the inner shell 20*b* is assembled with components to be installed inside the shell 20, such as the stimulation modules 30, 40 and the like; and then, the outer shell 20*a* is formed around the inner shell 20*b* through over-molding, achieving good sealing effect for the components inside the shell 20. The outer shell 20*a* is integral and play a waterproof and dustproof role, facilitating cleaning and storage of the sex toy 100.

In this embodiment, the shell 20 includes a main portion 22, a vibration portion 24 and a plurality of swinging portions 26. The swinging portions 26 extend outwardly from the main portion 22, and the vibration portion 24 is surrounded by and connected to inner ends of the swinging portions 26 integrally. A chamber 28 is formed among the swinging portions 26 of the shell 20 for accommodating a part of the human body (such as the breasts) that needs to be stimulated therein. Preferably, the chamber 28 has a size decreased gradually and inwardly. That is, the chamber 28 has the maximum size at its open side.

In this embodiment, the vibration portion 24 is dome-like, and the swinging portion 26 is sheet-like. In whole, the vibration portion 24 and swinging portions 26 are configured like a flower, wherein the vibration portion 24 is configured as a flower core, and the swinging portions 26 are configured as flowers petals. Outer ends of the swinging portions 26 extend slightly away from each other, and thus the chamber 28 is generally bowl-shaped, which can fit the shape of the breasts of the human body better. Specifically, a depth d of the chamber 28 may be 3-300 mm, and the diameter D of the chamber 28 at its open side may be 10-200 mm.

In this embodiment, the swinging portions 26 are set evenly along a circumferential direction, and symmetrical relative to the vibration portion 24. Specifically, the swinging portions 26 are spaced from each other in the circumferential direction, and a gap 29 is defined between each two neighboring swinging portions 26. Thus, the swinging portions 26 will not interfere with each other during operation. Accordingly, swinging amplitude of the swinging portions 26 may be greater and stimulation to the human body may be stronger. It should be understood that the swinging portions 26 may be set unsymmetrically, and/or, may be formed with different sizes or shapes.

In this embodiment, the stimulation modules includes a first stimulation module 30 and a second stimulation module 40, wherein the second stimulation module 40 is used to drive the swinging portions 26 to swing, and the first stimulation module 30 is used to drive the vibration portion 24 to vibrate.

As shown in FIG. 3 and FIG. 4, the first stimulation module 30 includes at least one vibration motor, which is mounted in the vibration portion 24 of the shell 20 for generating high-frequency vibration to the part of the human body accommodated inside the chamber 28. When the present the sex toy 100 is used to stimulate the breasts, the vibration motor 30 drives the vibration portion 24 to stimulate the nipples, obtaining a better stimulation effect.

Figure 5:
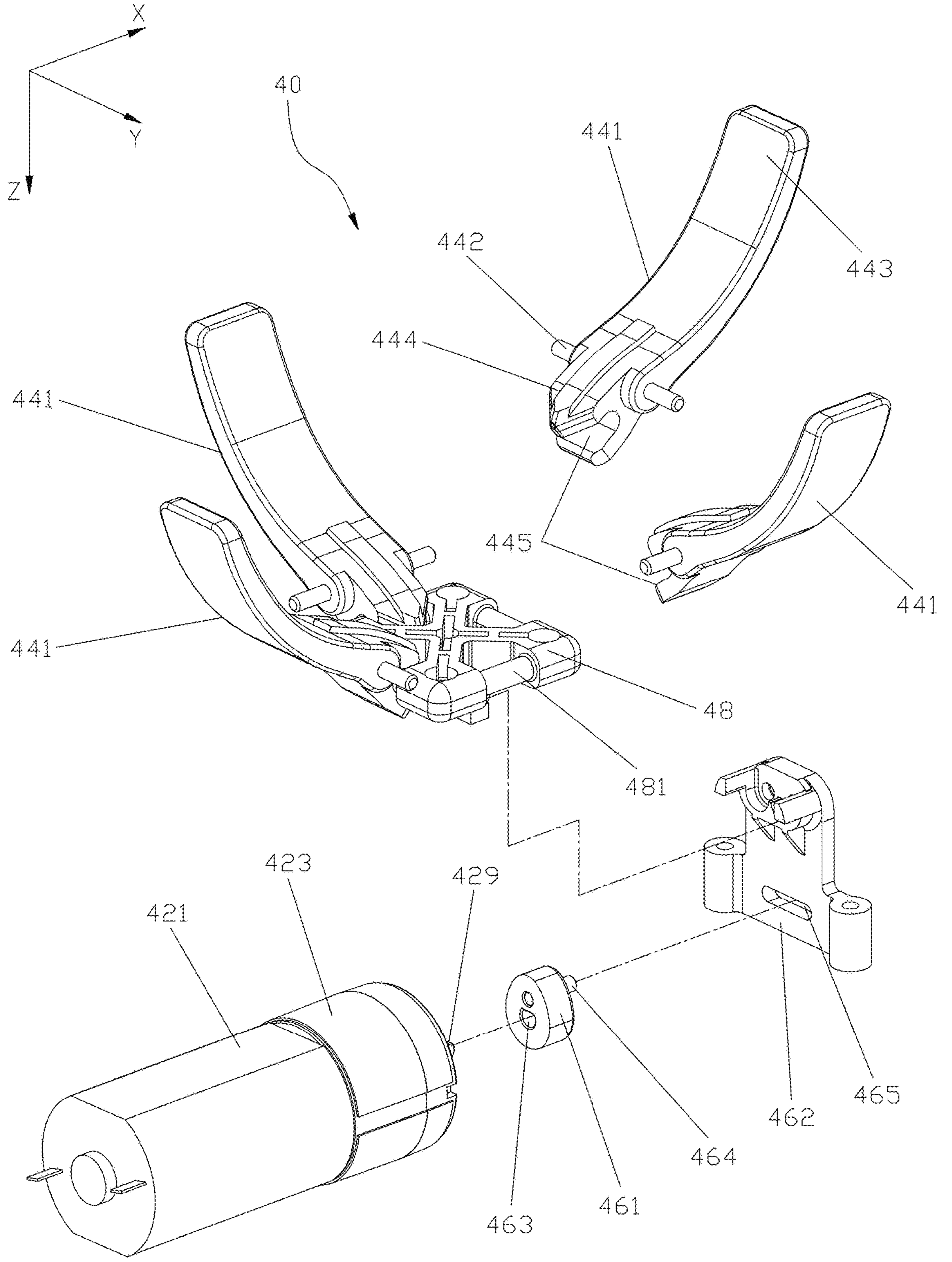
FIG. 5 is a further exploded view of a first stimulation module of the sex toy of FIG. 1.
Figure 6:
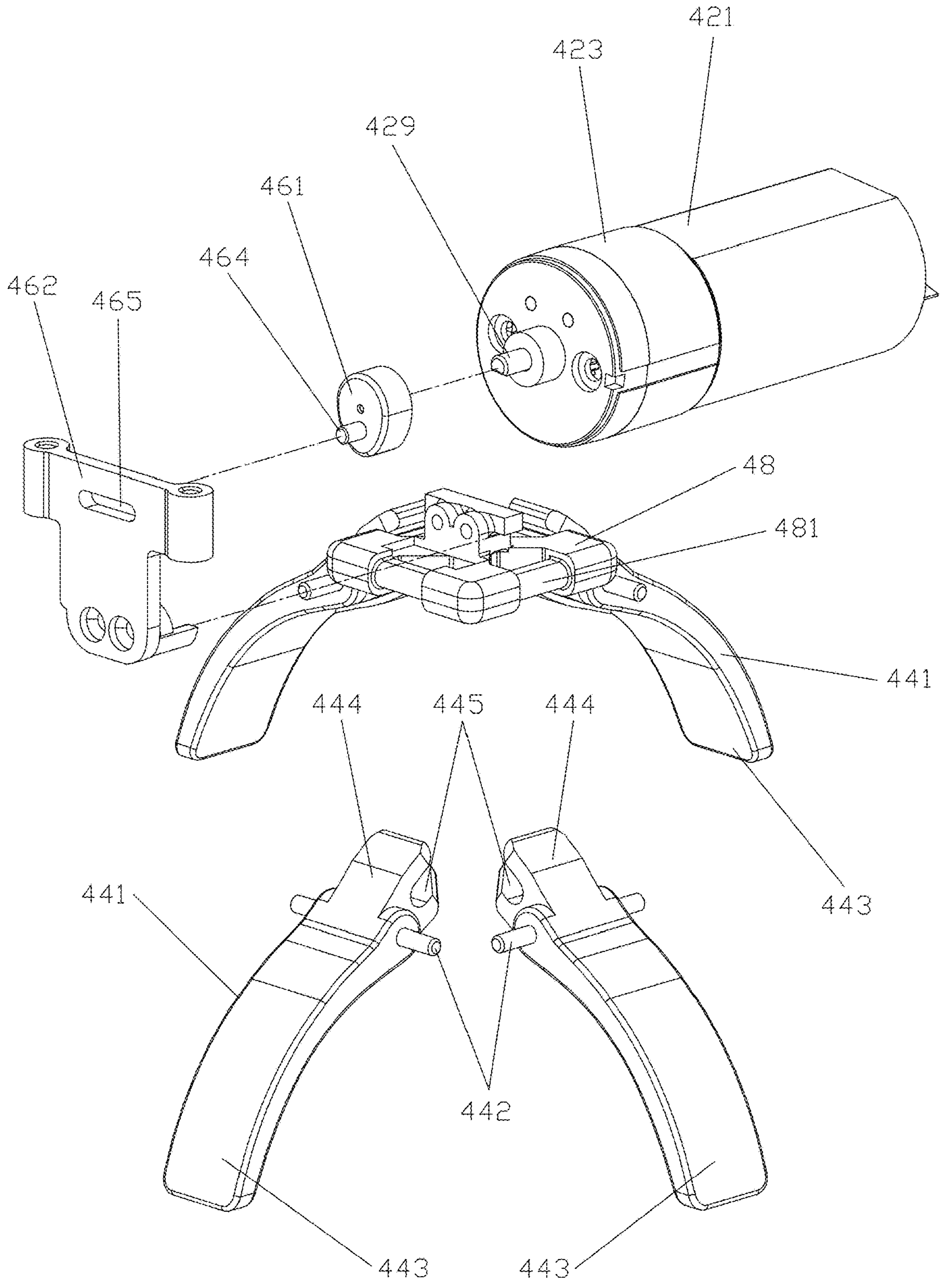
FIG. 6 is an exploded view of the first stimulation module viewed from another aspect.

As shown in FIG. 5 and FIG. 6, the second stimulation module 40 includes a gearbox 42, a swinging unit 44, and a transmission unit 46 connected between the gearbox 42 and the swinging unit 44.

Figure 7:
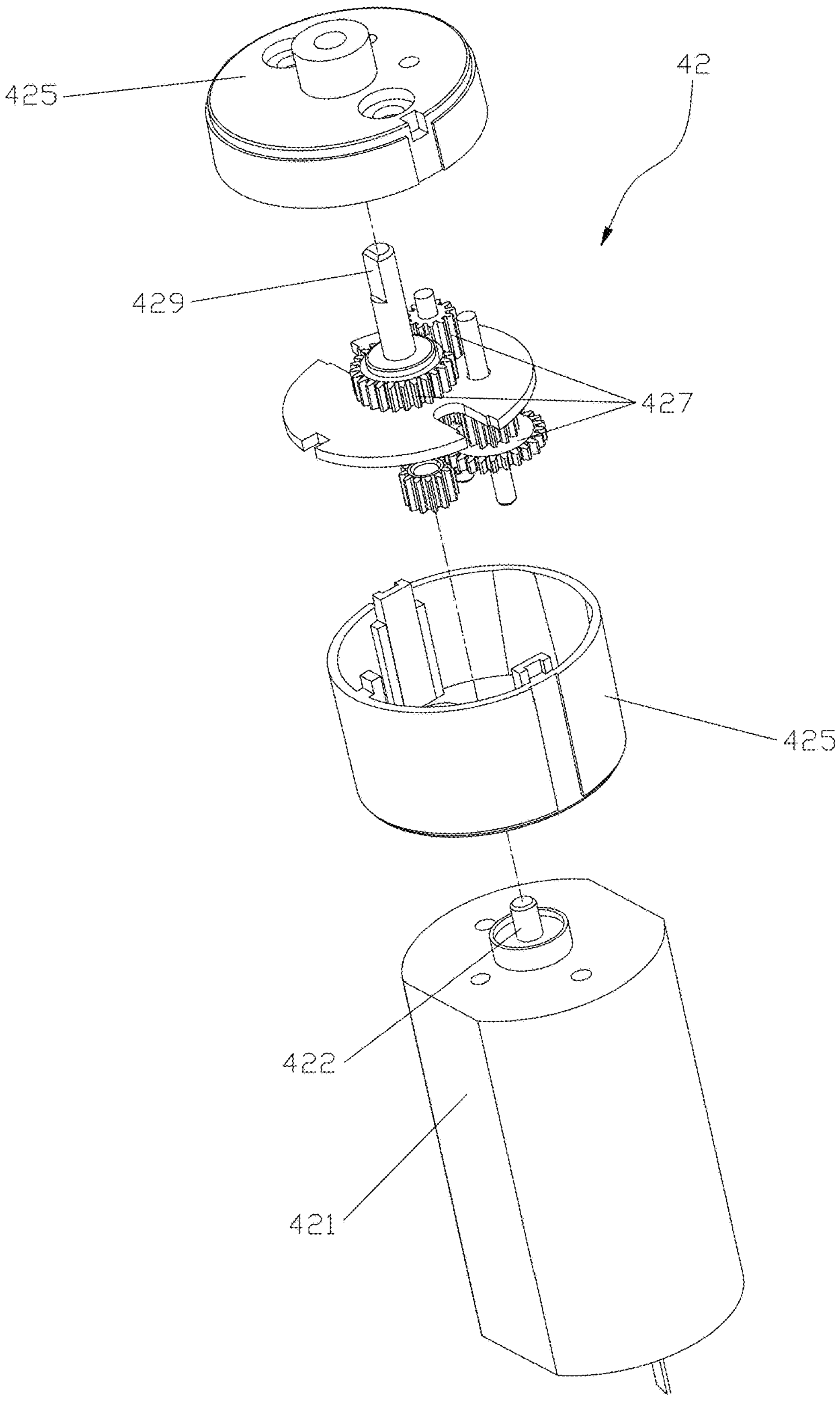
FIG. 7 is a further exploded view of a gearbox of the first stimulation module of FIG. 5.

Referring to FIG. 7, the gearbox 42 includes a rotary motor 421 and a reduction gear unit 423 connected to the rotary motor 421. The rotary motor 421 serves as a driving component of the second stimulation module 40 and has an output shaft 422 rotating at high-speed. The reduction gear unit 423 includes a gear housing 425 and a plurality of gears 427 arranged in the gear housing 425. The gears 427 mesh with each other, and a reduction ratio of the whole gearbox 42 can be determined according to the gear ratios between the meshed gears 427 of the reduction gear unit 423. In an embodiment, the reduction ratio of the gearbox 42 is not less than 4:1 and not more than 100:1.

The reduction gear unit 423 has an output shaft 429, wherein the output shaft 429 serves as an output shaft of the gearbox 42. Under the reduction effect of the reduction gear unit 423, a speed of the output shaft 429 does not exceed 1000 rpm.

The transmission unit 46 is configured for converting rotation of output shaft 429 of the gearbox 42 into reciprocating linear movement. In this embodiment, the transmission unit 46 includes an eccentric wheel 461 and a sliding block 462.

The eccentric wheel 461 is connected to the output shaft 429 at a central portion thereof. In this embodiment, the eccentric wheel 461 defines a central hole 463 for inserting of the output shaft 429 therein. The central hole 463 is non-circular shaped, such as D-shaped, and a cross section of the output shaft 429 has a shape matching with that of the central hole 463. After inserting of the output shaft 429 into the central hole 463, a relative rotation therebetween is limited for shape fitting, thereby the eccentric wheel 461 can rotate along with the output shaft 429 of the gearbox 42.

An eccentric rod 464 is set eccentrically on the eccentric wheel 461 and extends towards the sliding block 462. Generally, the eccentric rod 464 is parallel to the output shaft 429 of the gearbox 42. In this embodiment, as shown in FIG. 5, the eccentric rod 464 and the output shaft 429 both extends along X-direction. During rotation of the eccentric wheel 461 along with the output shaft 429, the eccentric rod 464 revolves round the output shaft 429 in YZ plane. In other words, under the driving of the gearbox 34, the eccentric rod 464 generates displacements in both Y-direction and Z-direction.

The sliding block 462 defines a sliding groove 465 therein, which is generally strip-shaped and elongated in a direction perpendicular to the eccentric rod 464, such as the Y-direction. The eccentric rod 464 engages into the sliding groove 465, and is fixed relative to the sliding block 462 in the Z-direction whilst is slidable relative to the sliding block 462 in the Y-direction. During revolving of the eccentric rod 464 round the output shaft 429, its displacement in the Y-direction makes it slide relative to the sliding block 462 along the sliding groove 465, while its displacement in the Z-direction drives the sliding block 462 to move along with it in the Z-direction.

By means of the cooperation of the eccentric rod 464 of the eccentric wheel 461 and the sliding groove 465 of the sliding block 462, rotation of the gearbox 42 is converted into reciprocating linear motion of the sliding block 462 in the Z-direction.

The swinging unit 44 includes multiple swinging bars 441 arranged around the sliding block 462. Each of the swinging bars 441 is rotatably connected to the shell 20, preferably the inner shell 20*b*, by a first pivot 442. In this embodiment, the swinging bar 441 is generally sheet-like and elongated in the Z-direction. One end of the swinging bar 441, preferably an end away from the first pivot 442, is configured as a swinging end 443 and extends into the swinging portions 26 of the shell 20; and, another end of the swinging bar 441, preferably an end adjacent to the first pivot 442, is configured as a connecting end 444 and connected to the sliding block 462.

The first pivots 442 extend perpendicular to the Z-direction, wherein some of the first pivots 442 extend along the X-direction, and some of the first pivots 442 extend along the Y-direction. When the sliding block 462 moves in the Z-direction, the swinging bars 441 are driven to swing about the first pivots 442, respectively. That is, the swinging bars 441 swing in the XZ plane or YZ-plane. The swinging ends 443 of all of the swinging bars 441 swing towards or away from each other synchronously, achieving an occlusion action to knead the part of the human body entering the chamber 28 and covered by the swinging bars 441.

Further, a sliding frame 48 is provided inside the shell 20 for rotatably connecting the swinging bars 441 to the sliding block 462. In this embodiment, the sliding frame 48 is generally constructed as a polygon structure with a number of lateral edges the same as the number of the swinging bars 441/swinging portions 26. The connecting end 444 of each swinging bar 441 is rotatably connected to a lateral edge of the sliding frame 48 by a second pivot 481. Each second pivot 481 is set to be generally parallel to a corresponding first pivot 442 for the same swinging bar 441.

The sliding frame 48 may be formed separately and then assembled to the sliding block 462, or, may be integrally formed with the sliding block 462 as one piece, as long as the sliding frame 48 can move together with the sliding block 462. In this embodiment, the second pivot 481 is integrally formed with the sliding frame 48 as one piece, and a U-shaped groove 445 is defined in the connecting end 444 of the swinging bar 441 for facilitating assembly of the second pivot 481 and the swinging bar 441. It should be understood that, in other embodiment, the second pivot 481 may be formed separately and then assembly to the sliding frame 48 and/or swinging bar 441.

In this embodiment, as shown in FIG. 5, the sliding frame 48 is generally square-shaped, and four swinging bars 441 are provided to connect four lateral edges of the sliding frame 48, respectively. Correspondingly, the shell 20 includes four swinging portions 26 arranged around the vibration portion 24 for accommodating the swinging ends 443 of the four swinging bars 441 therein, respectively.

Figure 8:
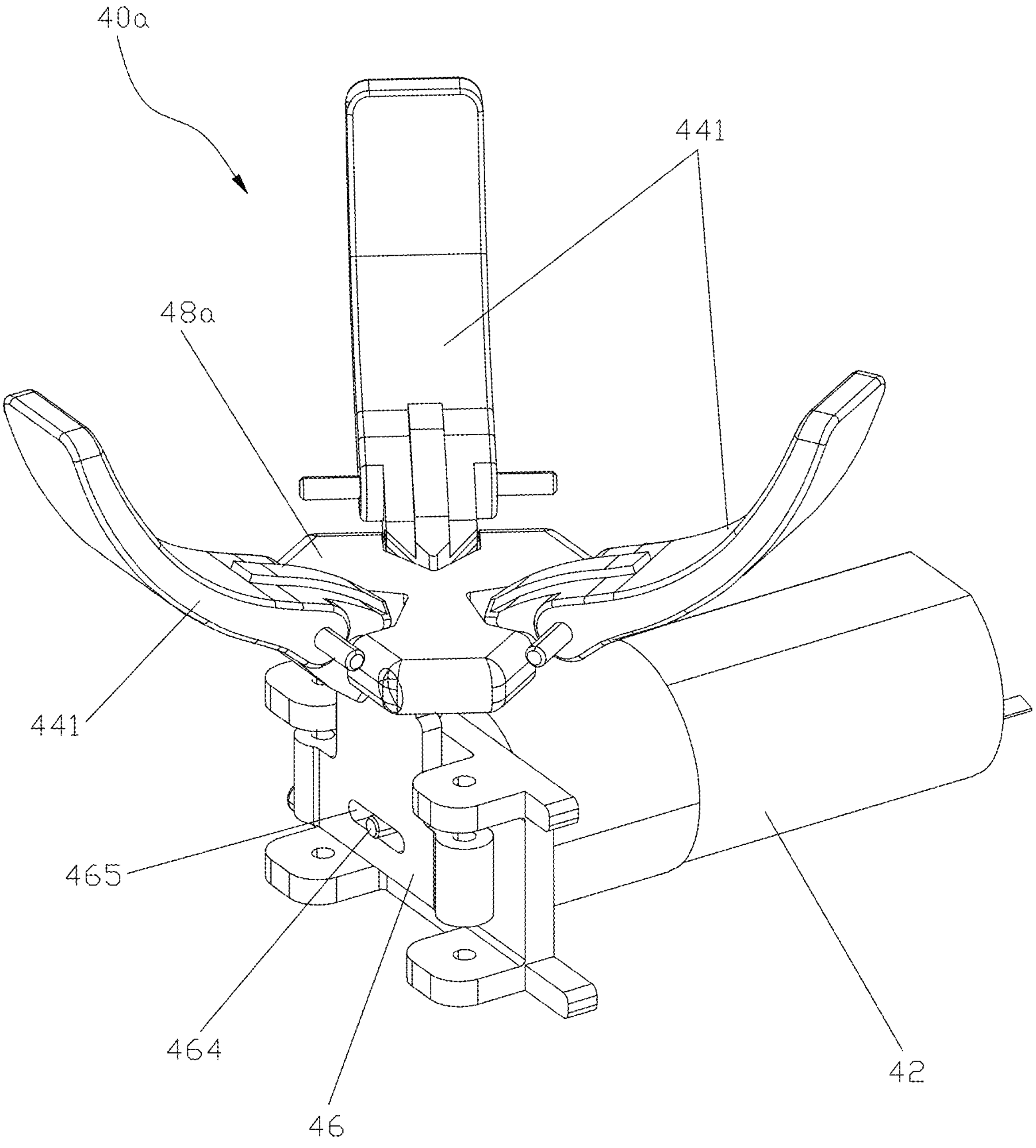
FIG. 8 is a schematic view of the first stimulation module according to another embodiment.

It should be noted that the number of the swinging portions and/or swinging bars are not limited to be four as the above embodiment. FIG. 8 shows an alternative embodiment of the second stimulation module 40*a*. In this embodiment, the second stimulation module 40*a* includes three swinging bars 441 connected to the transmission unit 46 by a sliding frame 48*a* which is generally hexagonal-shaped. Preferably, the sex toy may have 3-8 swinging bars 441, such as five or six swinging bars 441. Correspondingly, there may be 3-8 swinging portions 26. The sliding frame 48 may be configured with a number of lateral edges the same or larger than that of the swinging bars 441/swinging portions 26.

During operation, the sliding block 462 and the sliding frame 48 move together in the Z-direction under the driving of the gearbox 42, and in turn drives the swinging bars 441 to swing about the first pivots 442 relative to the shell 20, and swing about the second pivots 481 relative to the sliding frame 48 at the same time, thereby the swinging ends 443 and the swinging portions 26 swinging towards or away from each other to knead the human body, which is similar to a pinch motion of the human hand, providing a more comfortable sexual stimulation, and thus the users are more likely to reach orgasm with the help of the present sex toy 100.

In this embodiment, the first pivot 442 is adjacent to the connecting end 444 and away from the swinging end 443 of the swinging bar 441, so that the swinging end 443 of the swinging bar 441 rotates about the first pivot 442 can get a greater swing amplitude even if a swinging angle of the swinging bar 441 rotating about the second pivot 481 is small. Accordingly, the swinging portions 26 driven by the swinging bars 441 can provide an enhanced stimulation to the human body.

In some embodiment, another vibration motor may be provided inside the swinging portion 26 for further improving the stimulation effect. Preferably, the swinging portion 26 is provided with a vibration motor at a position adjacent to its swinging end 443, so that the vibration can be transferred to the human body more efficiently. It should be understood that the vibration motor may be provided in some or all of the swinging portions 26.

Referring to FIG. 3 and FIG. 4 again, a control circuit board 60 is mounted in the shell 20 and electrically connected to the rotary motor 421 and vibration motor 30 for controlling their operation according to user's instructions, such as controlling the vibration frequency of the vibration motor 30, controlling the rotary speed of the rotary motor 42, and etc. Control buttons, such as mechanical buttons or touch buttons, may be provided on the outer shell 20*a* for input the user's instructions. Further, a battery 70, preferably a rechargeable battery, is arranged in the main portion 22 of the shell 20 and electrically connected to electric components, such as the rotary motor 421, the vibration motor 30, and etc., through the control circuit board 60 for supplying electric power.

During operation, the second stimulation module 40 may be started separately to achieve a stimulation effect to the human body, such as the breasts, through swinging of the swinging portions 26; or, the first stimulation module 30 may be started separately to achieve a stimulation effect to the human body through the high-frequency vibration of the vibration portion 24; or, the first and second stimulation modules 30, 40 may be started at the same time to provide a multi-stimulation effect to the human body. For enhance user comfort, the swinging portions 26 and the vibration portion 24 of the shell 20 are constructed as a soft single-layer structure, i.e., without the hard inner shell 20*b*.

For the present sex toy 100, a chamber 28 is formed among several swinging portions 26 to accommodate a part of the human body, such as the breasts, and the swinging portions 26 swing towards or away from each other to pinch the part of the human body inside the chamber 28, which is more suitable for women, particularly for stimulating the breasts of the women. It should be understood that stimulating the breasts may not enhance the sexual experience during sexual lift, but also play a role in treating breast diseases in healthcare. In addition, such sex toy may also be used for man, such as stimulating the glans penis.

Figure 9:
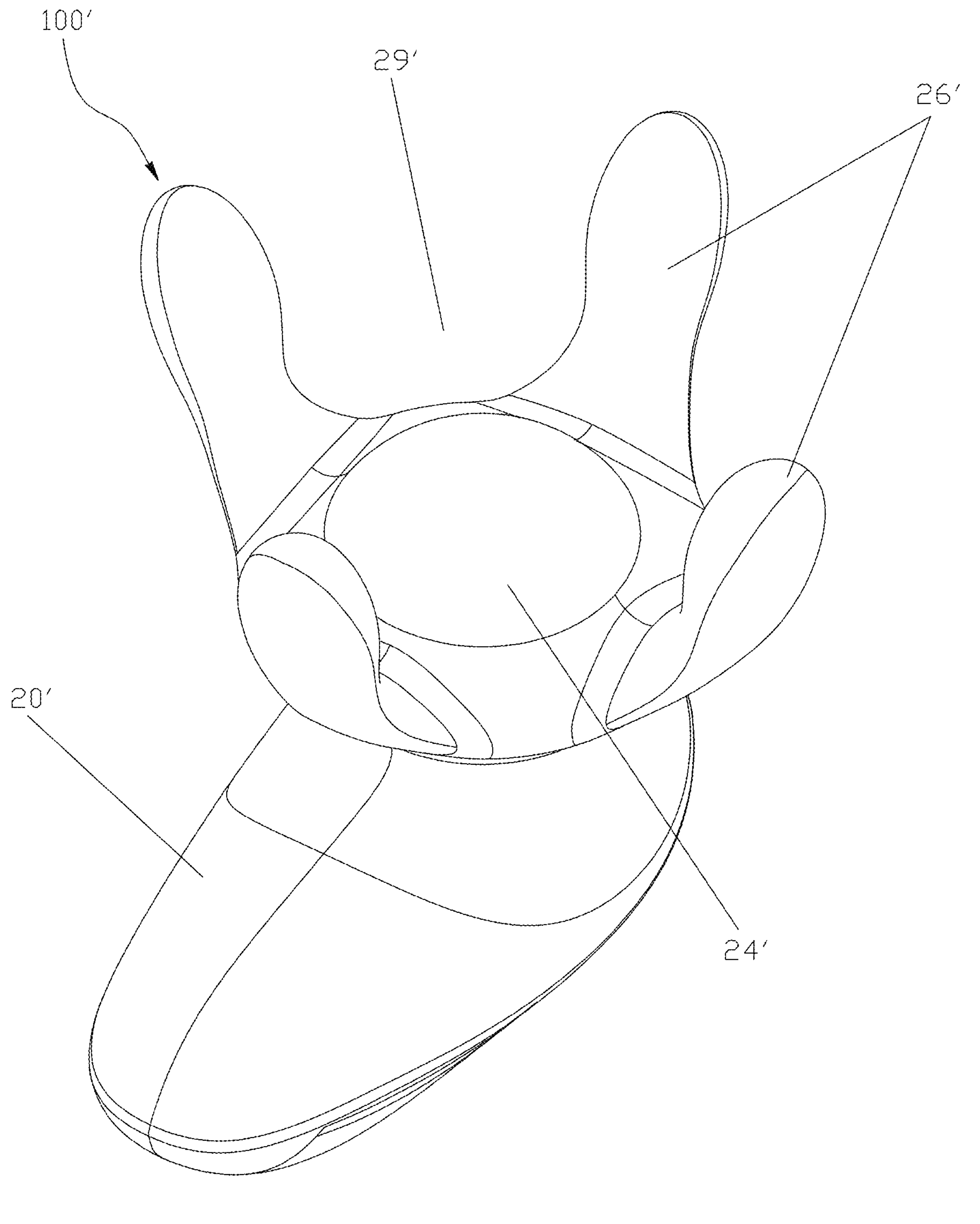
FIG. 9 is a schematic view of the sex toy according to a second embodiment of the present application.

Furthermore, it should be noted that the swinging portions of the sex toy are not limited to be shaped as a flower petal as the forgoing embodiments. In other embodiments, the swinging portion may be shaped as a finger, claw and etc. FIG. 9 shows an alternative embodiment of the sex toy 100', wherein the swinging portions 26' of the shell 20' are shaped as fingers and arranged around the vibration portion 24'. In this case, gaps 29' between neighboring swinging portions 26' are much wider.

Figure 10:
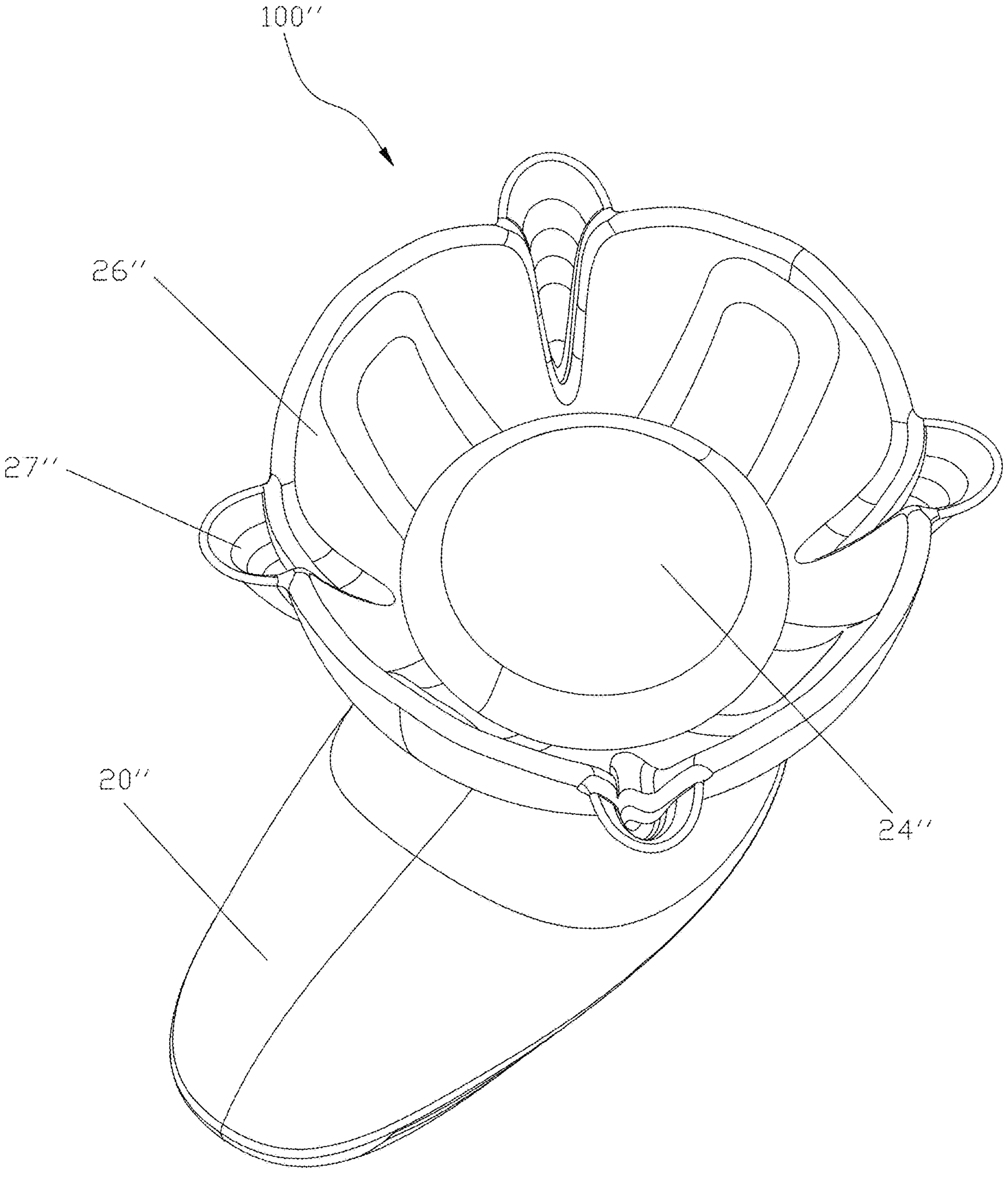
FIG. 10 is a schematic view of the sex toy according to a third embodiment of the present application.

Moreover, the swinging portions are not limited to be separated from each other. FIG. 10 shows an alternative embodiment of the sex toy 100", wherein several swinging portions 26" are arranged around a vibration portion 24", and a connecting portion 27" is formed between each two neighboring swinging portions 26" of the shell 20". Preferably, the connecting portions 27" are flexible and curved, which will not affect the swinging motion of the swinging portions 26".

When the swinging portions 26" covers on the breasts during use, a sealed space with negative pressure may be formed between the swinging portions 26" and the human body, which further improves the stimulation effect of the present sex toy 100". For improve the flexibility and reliability, the connecting portion 27" are integrally formed with the swinging portions 26" by soft silicone, wherein a thickness of the connecting portion 27" is much less than that of the swinging portion 26".

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sex toy, comprising:

a shell comprising a central portion and at least three swinging portions extending outwardly from an outer periphery of the central portion, the at least three swinging portions being arranged along a circumferential direction of the central portion and cooperatively defining a chamber for accommodating a breast of a human body therein; and at least three swinging bars being rotatably connected to the shell, respectively, the at least three swinging bars each comprising a swinging end, the swinging end of each of the at least three swinging bars extending into the at least three swinging portions, respectively, so as to drive the at least three swinging portions to swing towards the central portion or away from the central portion to knead the breast accommodated inside the chamber, when in use.

2. The sex toy according to claim 1, wherein the chamber is bowl-shaped, and has a diameter increased along an axial direction away from the central portion.

3. The sex toy according to claim 2, wherein a depth of the chamber is 3-300 mm, and the diameter of the chamber at its open side is 10-200 mm.

4. The sex toy according to claim 1, wherein the central portion is dome-shaped, and is provided with a vibration member therein for stimulating a nipple of the breast.

5. The sex toy according to claim 4, wherein distal ends of the at least three swinging portions extend beyond the central portion in an axial direction of the central portion.

6. The sex toy according to claim 1, wherein the at least three swinging portions comprises 3-8 swinging portions, and each of the swinging portions is configured as a sheet or a column.

7. The sex toy according to claim 6, wherein the at least three swinging portions are spaced from each other in the circumferential direction of the central portion.

8. The sex toy according to claim 6, wherein a connecting portion is provided between and interconnects each two neighboring swinging portions.

9. The sex toy according to claim 8, wherein all of the connecting portions and all of the swinging portions are integrally formed as one piece, and a thickness of the connecting portion is less than that of the swinging portion.

10. The sex toy according to claim 1, further comprising a gearbox for driving the at least three swinging bars to rotate relative to the shell, the gearbox comprises a rotary motor and a reduction gear unit connected to the rotary motor, and a speed of an output shaft of the gearbox does not exceed 1000 rpm.

11. The sex toy according to claim 10, wherein the reduction gear unit comprises a plurality of gears, and a reduction ratio of the reduction gear unit is not less than 4:1 and not more than 100:1.

12. The sex toy according to claim 10, further comprising a transmission unit connected between the gearbox and the at least three swinging bars for converting rotation of the gearbox into linear reciprocating motion in a first direction; each of the at least three swinging bars further comprises a connecting end being rotatably connected to the transmission unit.

13. The sex toy according to claim 12, wherein the transmission unit comprises a sliding frame being driven to do linear reciprocating motion in the first direction, the sliding frame is polygon-shaped, and the connecting end of each of the at least three swinging bars is rotatably connected to a lateral edge of the sliding frame.

14. The sex toy according to claim 13, wherein a U-shaped groove is defined in the connecting end of each of the at least three swinging bars, and a second pivot is provided at each lateral edge of the sliding frame, and wherein each second pivot is pivotally engaged in the U-shaped groove.

15. The sex toy according to claim 14, wherein each of the at least three swinging bars is rotatably connected to the shell by a first pivot, each first pivot extends perpendicular to the first direction and parallel to a respective second pivot, and wherein each first pivot is adjacent to the connecting end of a respective swinging bar and away from the swinging end of the respective swinging bar.

16. The sex toy according to claim 15, wherein the transmission unit further comprises an eccentric wheel and a sliding block, the eccentric wheel comprises an eccentric rod extending along a second direction and revolving round the output shaft of the gearbox under the driving of the gearbox, the sliding block defines a sliding groove being elongated along a third direction which is perpendicular to the first direction and second direction, and the eccentric rod is slidably engaged in the sliding groove, and the sliding frame is connected to and moves along with the sliding block.

17. A sex toy, comprising:

a shell comprising a vibration portion and a plurality of swinging portions extending outwardly from an outer periphery of the vibration portion, the plurality of swinging portions cooperatively defining a chamber for accommodating a breast of a human body therein;

a first stimulation module comprising a vibration member mounted in the vibration portion; and a second stimulation module comprising a motor, a polygon-shaped sliding frame driven by the motor, and a plurality of swinging bars, wherein each of the plurality of swinging bars comprising a connecting end being rotatably connected to a lateral edge of the sliding frame, a swinging end extending into one of the plurality of swinging portions, and a middle portion being rotatably connected to the shell.

18. The sex toy according to claim 17, wherein the chamber is bowl-shaped, a depth of the chamber is 3-300 mm, and a diameter of the chamber at its open side is 10-200 mm.

* * * * *